INVENTOR
LEONARD E. CONNER
BY William R. O'Meara

United States Patent Office 3,453,516
Patented July 1, 1969

3,453,516
INDUCTION MOTOR STARTING CIRCUIT UTILIZING THE INDUCED VOLTAGE IN THE STARTING WINDING TO CONTROL SWITCHING OF THE STARTING CIRCUIT
Leonard E. Conner, St. Louis County, Mo., assignor, by mesne assignments, to Wagner Electric Corporation, South Bend, Ind., a corporation of Delaware
Filed Mar. 3, 1966, Ser. No. 531,431
Int. Cl. H02p 5/28, 7/36; H02k 17/08
U.S. Cl. 318—221
33 Claims

ABSTRACT OF THE DISCLOSURE

A motor starting circuit having a static switching device connected in series with a starting winding, a pair of impedances connected in series with the starting winding and in parallel with the switching device, another pair of impedances connected across the starting winding and a pulse forming circuit connected with the impedances to produce control pulses for controlling the conductivity of the switching device and the energization of the starting winding, the pulse forming circuit being responsive to the induced voltage of the starting winding to cease producing control pulses when the voltage induced in the starting winding reaches a predetermined value.

---

This invention relates to control circuits and more particularly to an improved control circuit for an electric motor.

As is well known, many single-phase induction motors include a main or running winding which is energized to operate the motor and a starting or auxiliary winding which is initially energized to provide the starting torque. When the motor has reached a predetermined speed, the starting winding is disconnected from the motor circuit. In the past, the starting winding has been removed or disconnected from the motor circuit by various means, such as relays or switches which have current interrupting contacts that are operated, for example, by centrifugal devices responsive to the speed of the rotor of the motor. Such mechanical devices usually require considerable space within the motor casing and have certain other disadvantages in that they require rotatable members, are subject to failure as a result of arcing between contacts, contact wear, mechanical fatigue, etc.

It is an object of the present invention to provide novel circuit means for an electric motor wherein the above-mentioned disadvantages are substantially obviated.

It is another object of the present invention to provide relatively simple and effective circuit means responsive to voltage induced in the auxiliary winding of an induction motor for, in effect, disconnecting the auxiliary winding from the power supply source after the motor has accelerated to a desired speed.

It is another object of the present invention to provide novel starting means for a single-phase induction motor having running and starting windings wherein no moving parts are required, such as mechanically operated electric contacts for energizing and de-energizing the starting winding.

Another object is to provide an improved starting circuit for an induction motor having running and starting windings wherein the starting circuit is relatively simple and includes static circuit components for energizing the starting winding to start the motor and for de-energizing the starting winding in response to a predetermined speed of the motor whereby the necessity of mechanical contact making and breaking devices is not required.

Still another object is to provide novel control circuit means utilizing static components for energizing a starting winding of a single-phase induction motor to effect starting of the motor and for de-energizing the starting winding after the motor has started in response to the voltage induced in the starting winding.

These and other objects and advantages of the present invention will become apparent hereinafter.

Briefly, in accordance with one form of the present invention, circuit means for an electric motor having running and starting windings are provided which includes controlled switching means for connection with the starting winding for controlling the energization and de-energization thereof, and control means for the switching means responsive to the induced voltage in the starting winding to de-energize the starting winding when the induced voltage reaches a predetermined value.

In the drawings which illustrate embodiments of the invention.

Figure 1:
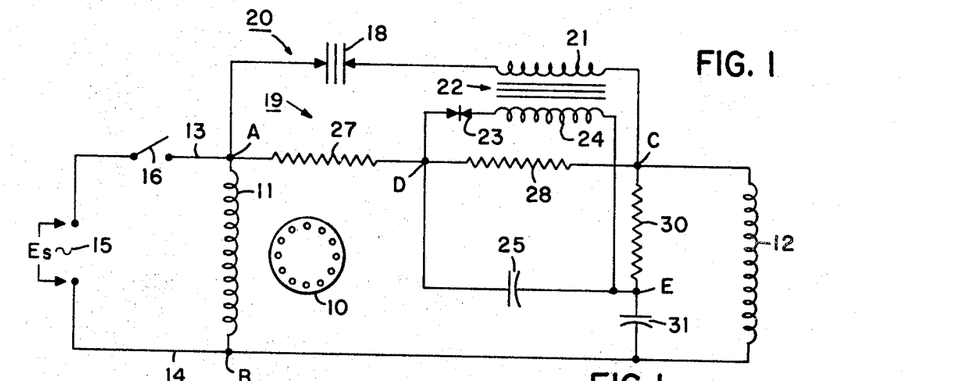
FIG. 1 is a circuit diagram of one motor circuit embodying the present invention.
Figure 1A:
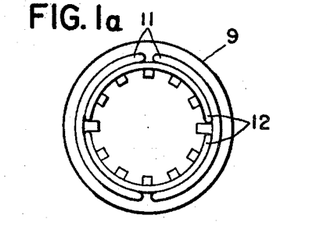
FIG. 1a is a diagrammatic end view of a stator having the running and starting windings of FIG. 1 disposed therein.

Referring now to FIG. 1, there is shown a single-phase induction motor including a rotor 10, which may be of the well-known squirrel cage type, and stator windings including a main or running winding 11 and an auxiliary or starting winding 12. The running and starting windings 11 and 12 are physically displaced, for example, by 90 electrical degrees from each other in a stator core 9, as illustrated diagrammatically in FIG. 1a. In the motor shown in FIG. 1, the resistance of the starting winding is effective to provide phase splitting so that the currents in the starting and running windings differ in phase and provide the necessary starting torque. Once a motor of this type has reached a predetermined speed or is approaching its normal operating speed, it is desirable to de-energize or remove the starting winding from the motor circuit so that the motor thereafter run with only the running winding energized.

The running winding 11 is connected between a pair of circuit points or terminals A and B which are respectively connected by a pair of supply leads 13 and 14 to an alternating current power supply source 15 through a mechanical line switch 16 shown connected in lead 13.

A controlled main switch 18 is connected with the starting winding 12 to control the energization thereof. A switch control circuit, indicated generally at 19, controls the operation of switch 18, the switch 18 being controlled to effect energization of the starting winding 12 for starting the motor and being controlled in response to the induced voltage in the starting winding 12 due to rotation of rotor 10 to, in effect, disconnect the starting winding 12 from the supply source when the speed of the motor reaches the speed at which it is desired to remove or de-energize the starting winding.

More particularly, the circuit of FIG. 1 includes a series circuit, indicated generally at 20, which includes the controlled main switch 18, which is shown as a two-terminal, solid state or static switching device that is fully described hereinafter, a secondary winding 21 of a pulse transformer 22, and the starting winding 12, all connected in series with each other across terminals A and B between the supply leads 13 and 14.

The main static switch 18 is a swell-known bilateral semi-conductor which is sometimes referred to as a symmetrical avalanche switching silicon diode. Such switching devices as switch 18 block current flow for all voltages thereacross which are below a predetermined level or the designed breakdown voltage value thereof. When a voltage exceeding the designed breakdown value is applied to switch 18 for even a very short period of time, the impedance thereof quickly drops to a very low value and remains low until such time as current substantially ceases to flow therethrough. Once current ceases to flow or reaches a predetermined low value, the switch 18 again blocks current until a voltage exceeding the designed breakdown value is again impressed across it. One such type of device is identified by "TBS–20A" in the Transitron Electronic Corp. catalog, Sheet TE–1356–20A, dated May 5, 1963.

The designed breakdown voltage of main switch 18 in FIG. 1 is higher than the supply voltage $Es$ of source 15. Switch 18 is fired into conduction by gating signals or control voltage pulses induced in the secondary winding 21 of pulse transformer 22 which increase the voltage across the switch 18 to the designed breakdown voltage value during the starting period of the motor. The voltage across switch 18 is, of course, the sum of the instantaneous values of the supply voltage and the voltage induced in secondary winding 21.

Voltage pulses are induced in secondary winding 21 by control circuit 19 during the starting period of the motor to energize the starting winding 12 by means of a switching device shown as a static or solid state control switch 23 connected in series relation with the primary winding 24 of pulse transformer 22 across energy storage means, shown as a capacitor 25. The capacitor 25 is adapted to be charged to a voltage value sufficient to fire the control switch 23 so as to be discharged through the primary winding 24 to produce a control voltage pulse in the series circuit 20 to effect firing of main static switch 18.

The control switch 23 is also a bilateral conducting semi-conductor or symmetrical switching silicon diode having generally the same characteristics hereinbefore mentioned in connection with main static switch 18 although the designed breakdown voltage of control switch 23 is lower than that of switch 18. One such type of device is identified by "ER–900" in the Transitron Electronic Corp. catalog, Sheet TE–1356–900, dated May 1964.

In the circuit of FIG. 1, a pair of resistors 27 and 28 are connected in series with each other between terminal A and a circuit point or terminal C terminal C being located at a pont between starting winding 12 and secondary winding 21 of transformer 22. The capacitor 25 is connected between a circuit point or terminal D, located between the resistors 27 and 28, and a circuit point or terminal E, the circuit point E being located between a resistor 30 and capacitor 31 which are connected in series with each other across the starting winding 12 between circuit points C and B with capacitor 31 connected between points B and E. The sum of the resistances of resistors 27 and 28 is made so high that substantially no effective supply current flows in the starting winding 12 when the main static switch 18 is non-conductive.

Figures 2, 3:
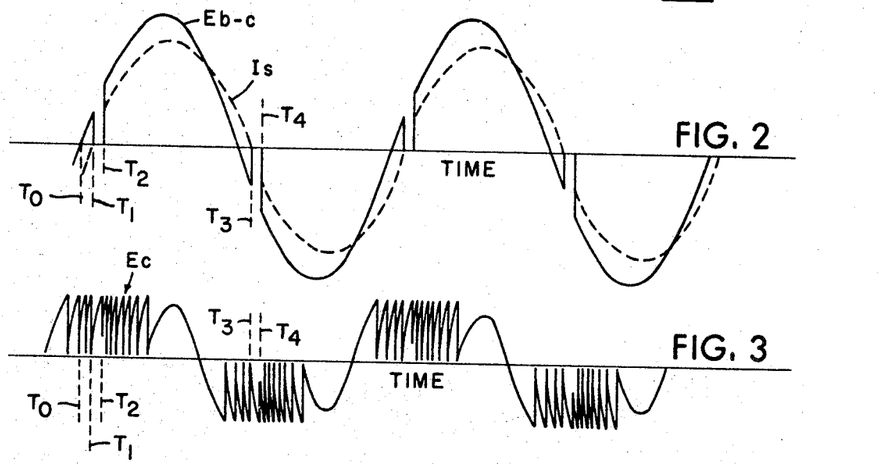
FIGS. 2 and 2a are illustrations of voltage and current waveforms appearing at points in the circuit of FIG. 1 at different times during the starting period of operation of the motor of FIG. 1.
FIG. 3 is an illustration of a waveform appearing across a capacitor of FIG. 1 during the starting period of operation of the motor of FIG. 1.

In order to supply alternating current from the supply source 15 to the starting winding 12 during the starting period of the motor, the main static switch 18 must be fired on each half cycle of the supply current since switch 18 reverts to its non-conductive or blocking state each time the supply current becomes predeterminately low or substantially zero in value. FIG. 2 illustrates typical current and voltage waveforms $Is$ and $Eb-c$ at the starting winding 12 when the motor 10 is at a standstill or just beginning to rotate, waveform $Is$ representing the starting winding current and waveform $Eb-c$ representing the voltage across the starting winding which is the voltage between circuit points B and C in FIG. 1. FIG. 3 illustrates a typical voltage waveform $Ec$ across capacitor 25 of FIG. 1 which controls the firing of main static switch 18.

The capacitor 25 is charged, when mechanical switch 16 is closed and the main static switch 18 is non-conductive, by current flowing through resistor 27, capacitor 25, and capacitor 31 which are connected in series with each other across the supply leads 13 and 14. Capacitor 31 is relatively large compared to capacitor 25 so that the time constant under these conditions is primarily determined by capacitor 25 and resistor 27. When the main static switch 18 is conducting, charging current for capacitor 25 also flows through resistor 28 which is effectively in parallel relation with resistor 27 so that the time constant is altered and the time required to charge capacitor 25 is somewhat less than when the main switch 18 is non-conductive. As seen from the waveform $Ec$ in FIG. 3, capacitor 25 is charged and discharged several times during each half cycle of the supply voltage $Es$.

The instantaneous magnitude of the voltage across capacitor 25 before it is discharged through primary winding 24 by the control switch 23 is determined by the instantaneous voltages across the components of the resistance-capacitance network including the resistors 27, 28 and 30, and the capacitor 31, and the voltage induced in the starting winding 12. As is well known, the voltage induced in the starting winding 12 by the running winding 11 due to rotation of rotor 10 will be 90° out of phase with the supply voltage of source 15 and of a magnitude that is proportional to the speed of the rotor 10. It is this induced voltage in the starting winding 12 which is utilized to alter the conditions existing in the above-mentioned resistance-capacitance network so as to prevent further firing of the main switch 18 after the speed of the motor reaches the desired predetermined value to thereby "disconnect" or effectively remove the starting winding 12 from the motor circuit, as will be explained in greater detail hereinafter.

Considering first the operation of the circuit of FIG. 1 during the initial starting period of the motor, at the time $T_0$ in FIGS. 2 and 3, the supply voltage and starting winding voltage $Eb-c$ are at the zero value and the starting winding current $Is$ is negative and decreasing toward the zero value, the current $Is$ lagging the voltage $Eb-c$ by a small amount at this time due to some reactance in the starting winding circuit. When the current $Is$ reaches the zero value at time $T_1$, the main switch 18 reverts to its non-conducting or high impedance state and blocks line voltage and current from the starting winding 12 until the main switch 18 is again fired at time $T_2$. The switch 18 is fired at time $T_2$ by a voltage pulse induced in secondary winding 21 resulting from the firing of control switch 23 and the accompanying discharge of capacitor 25 through the primary winding 24. The charge and discharge of capacitor 25 effective to fire the main switch 18 at time $T_2$ is indicated by the voltage pulse between times $T_1$ and $T_2$ in FIG. 3, which times correspond respectively with the times $T_1$ and $T_2$ in FIG. 2. After the main switch 18 is fired at $T_2$, it remains conductive and current $Is$ flows on its positive half cycle in the starting winding until the current becomes substantially zero, as indicated at time $T_3$. The switch 18 again becomes nonconductive blocking the voltage and current from the starting winding between the times $T_3$ and $T_4$. At time $T_4$ the main switch 18 is again fired by a voltage pulse induced in secondary winding 21 as a result of capacitor 25 firing control switch 23 and discharging through secondary winding 24. The charging and discharging of capacitor 25, which effects the firing of switch 18 at time $T_4$, is indicated by the voltage pulse between the corresponding times $T_3$ and $T_4$ in FIG. 3. After switch 18 is fired at time $T_4$, the current $I_s$ continues to flow on its negative half cycle through starting winding 12 until it again decreases to substantially the zero value. The switch 18 continues to be fired on each half cycle of the supply current by one of the induced voltage pulses in secondary winding 21 in the above-described manner so as to supply alternating current ($I_s$) to the starting winding during the starting period of the motor.

When the static switch 18 is non-conductive, the secondary winding 21 of transformer 22 is, in effect, open-circuited since no current is flowing therein and very little energy is required in the primary winding circuit of transformer 22 to cause a voltage to be induced in the secondary winding 21 that is high enough to effect firing or triggering of the switch 18 to its conducting state. On the other hand, during the time switch 18 is conductive and current is flowing in the series circuit 20, the effective impedance of transformer 22 is materially reduced and the charging and discharging of capacitor 25 through control switch 23 and winding 24 have little or no effect on the voltage and current waves $Eb-c$ and $I_s$ during the starting period of the motor.

Figure 2A:
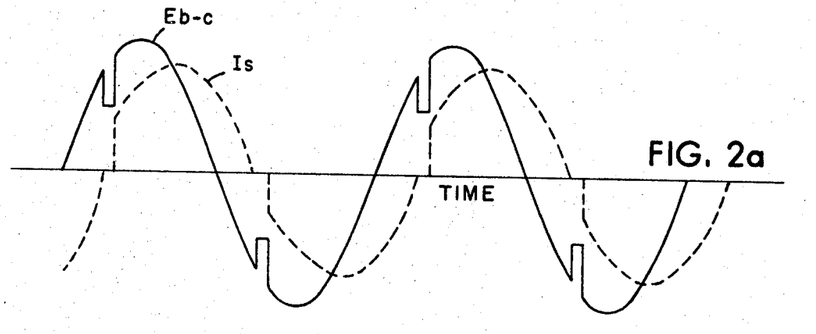

During the motor starting period, the induced voltage in the starting winding 12 increases as the speed of the motor increases so that the starting winding current $I_s$ changes its phase relation with the line voltage. FIG. 2a represents the voltage wave $Eb-c$ and current wave $I_s$ of the starting winding 12 when the rotor 10 is rotating at some intermediate speed below the predetermined speed at which the winding 12 is to be, in effect, disconnected from the motor circuit.

Figure 4:
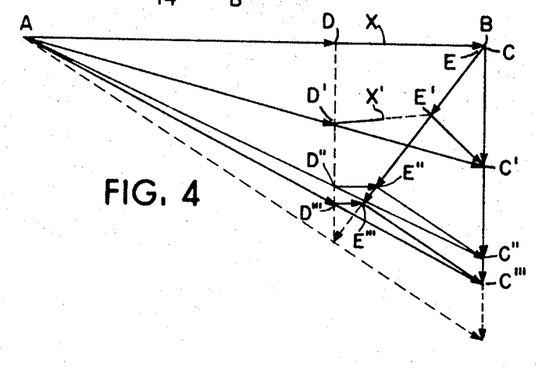
FIG. 4 is a vector diagram of voltages appearing across various points in the circuit of FIG. 1 at different times during the starting period of the motor.

FIG. 4 is a somewhat simplified vector diagram wherein the voltage vectors shown represent voltages measured between pairs of identified circuit points in FIG. 1 at various times during the starting period of the motor and at times when the static switch 18 is "off" or non-conductive. Each pair of letters identifying a vector in FIG. 4 represents the voltage as measured between the pair of circuit points in FIG. 1 that have the same letters as that vector. For example, vector A–C in FIG. 4 represents a voltage as measured between circuit points A and C in FIG. 1 at rotor standstill, vector D'–C' in FIG. 4 represents a voltage as measured between circuit points D and C occurring when the rotor 10 has accelerated to a speed somewhat below that at which it is desired to disconnect starting winding 12, etc.

After the mechanical switch 16 is closed but before the rotor 10 begins to rotate and while static switch 18 is non-conductive, substantially all of the supply voltage is across switch 18 and the reactances of the starting winding 12 and capacitor 31 are small so that the reactances thereof under these conditions have been neglected for sake of simplicity in FIG. 4. Thus, at rotor standstill it will be assumed that circuit points C, B and E are at the same potential (when static switch 18 is non-conductive) and that vectors A–D and D–B respectively represent the voltages across resistors 27 and 28. The line segment D–X in FIG. 4 represents the maximum value of voltage across capacitor 25, and the voltage value at which the control switch 23 fires. In other words, as the voltage between circuit points D and E increases, it is limited to the designed breakdown voltage value of switch 23.

As the static switch 18 is fired on each half cycle, as previously described herein, the rotor 10 starts to rotate and as it increases in speed the induced voltage (peak value) in the starting winding increases, for example, to the relative value indicated by vector B–C' in FIG. 4. The induced voltage is 90° out of phase with the supply voltage so that the resultant voltage (peak value) across resistors 27 and 28 or between circuit points A and C is now indicated by the vector A–C' which is phase displaced from the original vector A–C that occurred at rotor standstill. Since the resistor 30 and capacitor 31 are connected in series with each other across starting winding 12, the voltage across resistor 30, vector C'–E', leads the voltage across capacitor 31, vector B–E', by 90°. Since capacitor 25 is connected between circuit points D and E, the voltage across it is capable of reaching the magnitude necessary for firing switch 23 as represented by line segment D'–X'. As the speed of the motor further increases to the speed at which it is desired to, in effect, disconnect the starting winding 12 from the source 15, the induced voltage in winding 12 will increase, for example, to a value represented by the vector B–C'' so that the voltage across circuit points A and C can now be represented as vector A–C''. When the induced voltage reaches this peak value indicated by vector B–C'', the voltage across capacitor 31 will reach the value indicated by vector B–E'', the voltage across resistor 30 will reach the value indicated by vector C''–E'', and the voltage across capacitor 25 will reach the value indicated by vector D''–E''. Vector D''–E'' represents a peak value slightly less than the value indicated by line segment D–X, the value necessary to fire control switch 23. Thus, when induced voltage has reached the relative value indicated by vector B–C'', which value corresponds to the predetermined rotor speed at which it is desired to de-energize the starting winding 12, the control switch 23 can no longer be fired since the maximum voltage across capacitor 25 is now less than the magnitude of segment D–X, the magnitude corresponding to the designed breakdown voltage value of control switch 23. The motor at this time will continue to run with only the running winding 11 energized. As the speed of the motor further increases to the designed running speed of the motor, the induced voltage in starting winding 12 further increases, for example, to a value represented by vector B–C''', and the voltage across capacitor 31 increases to a value indicated by vector B–E''' so that the voltage across capacitor 25 will be even further reduced as indicated by vector D'''–E'''. Should the speed of the motor increase beyond the normal running speed of the motor, such as under no-load conditions, the voltage induced in the starting winding 12 will further increase and the voltage across capacitor 25 (between circuit points D and E) will further decrease, as is apparent from the dashed line portions of the vectors in FIG. 4.

By suitably varying the resistance of resistors 27 and 28 relative to each other, the motor speed at which the starting winding is effectively de-energized can be adjusted. For example, if the resistor 28 is decreased in value relative to resistor 27, the vector D–B in FIG. 4 will be shorter and the voltage between circuit points D and E will fall to a value below the predetermined breakdown voltage value of control switch 23 at a lower value of induced voltage in starting winding 12 than indicated in FIG. 4 to thereby, in effect, disconnect the starting winding 12 at a lower speed.

It is thus evident from FIG. 4 that as the induced voltage in starting winding 12 increases as the speed of rotor 10 increases, the available voltage across capacitor 25, between circuit points D and E of FIG. 1 decreases proportionally. When the voltage across capacitor 25 decreases to a value below the value necessary to fire the control switch 23 (magnitude of segment D–X), no further voltage pulses will be induced in secondary winding 21 and the static switch 18 will thereafter block current to the starting winding 12 to thereby de-energize or, in effect, disconnect the starting winding 12 from the supply source 15. In other words, the voltage across resistor 30 between circuit points C and E increases in magnitude and becomes more and more out of phase with respect to the applied voltage across resistor 28 between circuit points D and C as the speed of the motor increases so that the resultant peak value of the voltage across capacitor 25 which is connected across resistors 28 and 30 between circuits D and E (vector sum of the voltages across resistors 28 and 30) eventually becomes less than the designed breakdown voltage of control switch 23. By coupling the starting winding to the charging circuit of capacitor 25 in the manner described, the voltage across resistor 30 serves as a signal responsive to the speed of the motor to substantially inhibit or stop control voltage pulses in secondary winding 21 and, in effect, disconnect the starting winding 12 at the desired speed of rotation of the motor. Thus, the control signal pulses induced in the secondary winding 21 that control static switch 18 are responsive to the applied voltage from source 15 and the voltage induced in starting winding 12 due to rotation of the rotor 10.

Because the available voltage across circuit points D and E decreases as the speed of the motor increases, the number of times that the voltage across capacitor 25 reaches the designed breakdown voltage of control switch 23 during each half cycle of the supply voltage will decrease as the speed of the motor approaches or is near the speed at which it is desired to "disconnect" the starting winding. At such time, the static switch 18 may fire late in the supply voltage cycle, so that little energy is supplied to the starting winding even though the switch is fired.

Should the motor slow down from its normal running speed, for example, due to an overload condition, to the point where the induced voltage in the starting winding 12 causes the voltage across capacitor 25 to increase to the value necessary to effect firing of control switch 23, voltage pulses will again be produced by the discharge of capacitor 25 to again effect firing of static switch 18 to thereby again energize the starting winding 12.

For a given induction motor having a given turns ratio between the starting and running windings thereof, the magnitude of the induced voltage in the starting winding thereof will be at a certain magnitude when the rotor is rotating at the particular speed at which it is desired to de-energize the starting winding. In the circuit shown for illustration in FIG. 1, the peak value of the induced voltage at which it is desired to de-energize the starting winding is indicated in FIG. 4 to be about 45% of the peak value of the supply voltage since the length of vector B–C″ is shown to be about 45% of the length of the vector A–B. In the illustrated embodiment, the values of resistor 30 and capacitor 31 are chosen with respect to the resistors 27 and 28 such that the sum of the voltage drops across resistors 28 and 30 will be close to the breakdown voltage value of control switch 23 when rotor 10 is rotating substantially at the speed at which it is desired to de-energize the starting winding 12. From the vector diagram of FIG. 4, resistor 27 is indicated as being about twice the value of resistor 28 since about two-thirds of the supply voltage (A–B) is being across resistor 27 (A–D) and one-third across resistor 28 (D–B). Resistor 30 is indicated as having a resistance value of about one-third of the capacitance reactance of capacitor 31 since the length of the vectors C′–E′ and B–E′ are shown proportioned in this relationship. Capacitor 25 is chosen so that it is capable of charging up to the breakdown voltage value of control switch 23 in a relatively short time compared to a half cycle of the supply voltage so as to provide a considerable number of control voltage pulses (FIG. 3) during the initial starting period of the motor. The voltage breakdown value of control switch 23 is indicated in FIG. 4 (D–X) as being about 10% of the supply voltage. While particular relationships in the values of the various components of the circuit of FIG. 1 have been given herein for purpose of illustration, the invention is not intended to be limited thereby.

Figure 5:
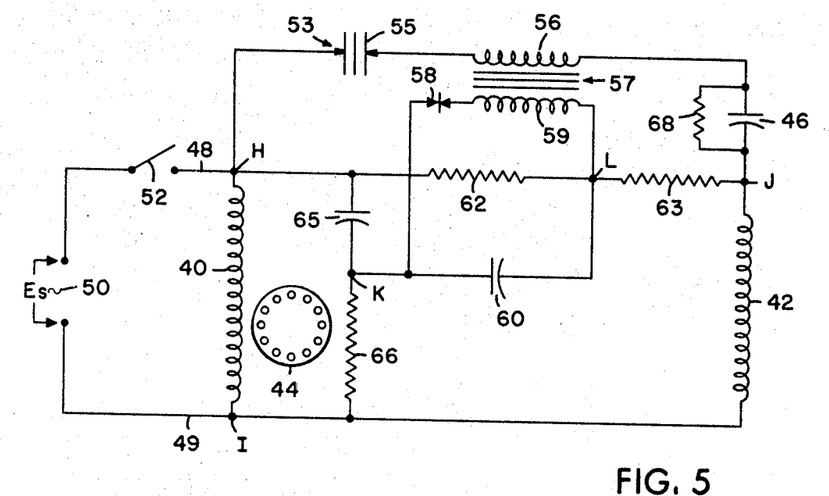
FIG. 5 is a circuit diagram of another embodiment of the present invention.

FIG. 5 illustrates another embodiment of the present invention wherein a modified control circuit is connected with a capacitor-start, induction-run type of motor. This induction motor includes a main or running winding 40 and an auxiliary or starting winding 42 disposed on a stator core (not shown), a rotor 44, for example, of the squirrel cage type, and a starting capacitor 46 in series with the starting winding to effect a phase difference between the winding currents to provide starting torque. The running and starting windings 40 and 42 are physically displaced in the startor core, for example, by 90 electrical degrees.

The running winding 40 is connected between a pair of circuit points or terminals H and I which are respectively connected by a pair of supply leads 48 and 49 to an alternating current power supply source 50 through a mechanical switch 52 connected in lead 48.

Connected across the terminals H and I is a series starting circuit 53 which includes a main static switch 55, a secondary winding 56 of a pulse transformer 57, the starting capacitor 46 and the starting winding 42 all connected in series with each other.

The main static switch 55 is a bilateral sericonductor or symmetrical avalanche switching silicon diode having characteristics similar to the static switch 18 of the circuit of FIG. 1. When main static switch 55 is suitably triggered or fired to its conductive state on alternate half cycles during the starting period of the motor, alternating current flows in the circuit 53 including the starting winding 42, and when switch 55 becomes non-conductive, current effectively ceases to flow in the starting winding.

The firing of main switch 55 is controlled by connecting a static control switch 58 and the primary winding 59 of transformer 57 in series with each other across a capacitor 60. The capacitor 60 is adapted to be discharged through primary winding 59 by control switch 58 for providing control voltage pulses in the secondary winding 56 that are of sufficient magnitude to effect firing of main switch 55 on alternate half cycles of the voltage of supply source 50 during the starting period of the motor. The static control switch 58 is also a symmetrical avalanche switching silicon diode having characteristics similar to the control switch 23 in FIG. 1. The circuit of FIG. 5 also includes a pair of resistors 62 and 63 connected in series between the circuit point H and a circuit point J located between starting capacitor 46 and starting winding 42. A capacitor 65 and resistor 66 are connected in series with each other directly across circuit points H and I. The capacitor 60 is also connected directly between a circuit point K which is located between capacitor 65 and resistor 66 and a circuit point L located between resistors 62 and 63. In order to prevent a build-up of an abnormally high voltage across the starting capacitor 46 during the starting period of the motor, a resistor 68 is connected across the capacitor 46 to provide a discharge path therefor and permit it to discharge during the non-conducting periods of the static switch 55.

After the mechanical switch 52 is closed, the running winding 40 is energized and current flows in the circuit to charge capacitor 60. When the voltage on capacitor 60 reaches the designed breakdown voltage value of control switch 58, capacitor 60 discharges through the primary winding 59 to induce a voltage pulse in the secondary winding 56 in circuit 53 which is sufficiently high to effect firing of static switch 55 so that supply current will flow through the starting capacitor 46 and starting winding 42. The capacitor 60 will charge and discharge a plurality of times on each half cycle so that static switch 55 is fired on each half cycle of the supply voltage to thereby supply alternating current to the starting winding 42 during the starting period of the motor.

As the speed of the motor increases, the voltage induced in the starting winding 42 increases and eventually the voltage across capacitor 60, between circuit points K and L, can no longer reach the designed breakdown voltage value of control switch 58. When this occurs no further voltage pulse is induced in the secondary winding 56 so that the static switch 55 thereafter remains non-conductive with the starting winding 42, in effect, disconnected from the supply source 50, as will be explained in greater detail hereinafter.

Figure 6:
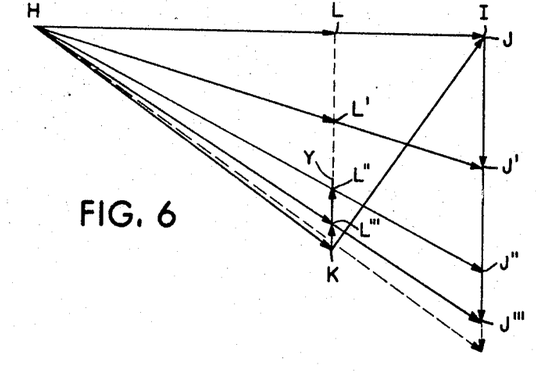
FIG. 6 is a vector diagram of voltages appearing across various points in the circuit of FIG. 5 at different times during the starting period of the motor.

The simplified vector diagram of FIG. 6 illustrates peak voltages appearing across the indicated pairs of circuit points of the circuit of FIG. 5 during the starting period of the motor and at times when the static switch 55 is non-conductive. Since the reactance of starting winding 42 is small, it is neglected for sake of simplicity so points I and J are indicated as being at the same potential at rotor standstill in FIG. 6. Vectors H–L and L–I, respectively, represent the voltages across resistors 62 and 63, and vectors H–K and K–I, respectively, represent the voltages across capacitor 65 and resistor 66, after mechanical switch 52 is closed but before the rotor 44 begins to rotate and when static switch 55 is "off."

The voltage vectors H–K and K–I are of constant length since capacitor 65 and resistor 66 are connected together directly across the supply leads 48 and 49. The capacitor voltage vector H–K, of course, lags the resistor voltage vector K–I by 90°. The line K–L, partially in dashed line, is tha voltage that would appear across capacitor 60 if the control switch 22 did not fire. However, the control switch 22 fires when the voltage across capacitor 25 reaches the magnitude indicated, for example, by the line segment K–Y. The magnitude of segment K–Y represents the magnitude of the voltage across capacitor 60 necessary to fire switch 58.

As static switch 58 is fired on each half cycle to supply alternating current to the starting capacitor 46 and winding 42, the rotor begins to rotate and increases in speed whereby there is an increasing induced voltage in the starting winding 42, which for example, increases to a value as indicated by vector I–J'. When the voltage across circuit points I–J (FIG. 5) reaches the magnitude indicated by vector I–J' (FIG. 6), the voltage vector H–J' occurs which is phase shifted from the original vector H–J. At this time the voltage across capacitor 60 is still capable of reaching the value Y necessary to fire the control switch 58. Line segment K–L' represents the voltage that would appear across capacitor 60 if control switch 22 did not fire at this time; however, the voltage across capacitor 60 is limited to the breakdown voltage of switch 58, as previously mentioned herein.

As the speed of rotor 44 further increases to the speed at which it is desired to de-energize the starting winding 42, the induced voltage in the starting winding 42 further increases to a predetermined value, such as indicated by vector I–J". When it reaches the relative magnitude indicated by vector I–J", the voltage across circuit points H and J (FIG. 5) may be represented by the vector H–J". The maximum voltage across capacitor 60 at this speed of rotation is indicated by vector K–L" and which is shown just slightly smaller than the line segment K–Y, the magnitude necessary to fire control switch 58. Since the voltage across capacitor 60 now can no longer reach the designed breakdown voltage value of static switch 58, the static switch 55 thereafter remains non-conductive and the starting winding 42 is, in effect, disconnected from the supply source 50. The motor then runs with only the running winding 40 energized. As the speed of the motor further increases to the designed running speed thereof, the voltage induced in the starting winding further increases, for example, to the value indicated by vector I–J''', and the maximum voltage across capacitor 60 further decreases as indicated by vector K–L'''. Should the speed of the motor increase above the normal running speed, such as under no-load conditions, the maximum voltage across capacitor 60, between circuits points K and L, will decrease still further.

The number of times that the capacitor 60 discharges through the primary winding 59 decreases as the speed of the motor approaches or is close to the speed at which it is desired to effectively remove the starting winding.

Should the speed of the motor of FIG. 5 slow down sufficiently, for example, as a result of an overload, the induced voltage in starting winding 42 will also decrease and the magnitude of the voltage across capacitor 60 will become great enough to again fire switch 58 so as to again fire static switch 55 and thereby again energize the starting winding 42.

Because the voltage between circuit points H and J in FIG. 5 changes in magnitude and phase as the speed of rotor 44 increases from standstill due to the increasing voltage induced in the starting winding 42, the voltage across resistor 62 (between points H and L) also changes in phase and magnitude with respect to the constant voltage across capacitor 65 (between points H and K). When the voltage induced in starting winding 42 reaches the value that corresponds to the motor speed at which it is desired to de-energize the starting winding, the voltage across resistor 62 is sufficiently out of phase with the substantially constant voltage across capacitor 65 and the vector sum of these voltages is just below the designed breakdown voltage value of control switch 58. Thus, the control switch can no longer fire to produce control pulses in the secondary winding 56 and the static switch 55 thereafter remains "off" or non-conductive.

In the embodiment shown in FIG. 5, the peak value of the voltage induced in the starting winding 42 is indicated to be about 50% of the supply voltage value when the starting winding is effectively de-energized as apparent from the relative lengths of the vectors H–I and I–J". The resistor 62 is indicated to be about twice as large as resistor 63 as the vector H–L is shown about twice the length as vector L–I in FIG. 6. The resistance of resistor 66 is indicated as being about 70% of the capacitance reactance of capacitor 65 as apparent from the relative lengths of vectors I–K and H–K. The relationship of values of the various components of the circuit of FIG. 5 given herein are, of course, not intended to limit the invention.

In the embodiments shown for illustration in FIGS. 1 and 5, the control circuits do not require mechanical switches having movable electrical contacts and these circuits have but relatively few components which can be arranged outside of the usual motor housing.

From the foregoing, it is obvious that the invention provides new and improved control means meeting the objects and advantages set forth hereinbefore, and others. It is to be understood that the foregoing description and accompanying drawings have been given only by way of illustration and example, and that changes and alterations may be made by those skilled in the art without departing from the invention, the scope of which is limited only by the claims which follow.

The embodiments of the invention in which an exclusive property or privilege is claimed are defined as follows:

1. In combination, an electric motor having running and starting winding means adapted to be energized by voltage supply means, and circuit means comprising controlled switching means connected with said starting winding means for controlling the energization thereof, said switching means being conductive in response to the application of the supply voltage to said circuit means to energize said starting winding means for starting the motor, and means responsive to voltage induced in said starting winding means in excess of a predetermined value to effect nonconduction of said switching means and de-energization of said starting winding means.

2. In combination, an electric motor having running and starting windings, means for connecting said running winding to voltage supply means, and circuit means adapted to be energized by said supply means comprising controlled switching means connected with said starting winding to control the energization thereof, and control means for said switching means responsive to the application of the supply voltage to said circuit means to effect conduction of said switching means for starting the motor and responsive to voltage induced in said starting winding to effect non-conduction of said switching means when the motor exceeds a predetermined speed.

3. In combination, an electric motor having running and starting windings, means for connecting said running winding to voltage supply means, a series circuit for connection with said supply means including controlled switching means connected in series circuit relation with said starting winding to effect energization thereof when conductive, and control circuit means coupled to said switching means to effect conduction of said switching means for starting the motor in response to the application of the supply voltage to said control circuit means, said control circuit means being coupled to said starting winding and responsive to voltage induced in said starting winding in excess of a predetermined value to prevent conduction of said switching means.

4. In combination, an induction motor having running and starting windings, means for connecting said running winding to voltage supply means, and a control circuit adapted to be energized by said supply means comprising signal responsive switching means connected in series with said starting winding to effect energization thereof when conductive and prevent effective energization thereof when non-conductive, and signal producing circuit means coupled to said switching means for producing a control signal in response to the application of the supply voltage to said control circuit to effect conduction of said switching means, said signal producing circuit means being coupled to said starting winding and responsive to voltage induced in said starting winding in excess of a predetermined value to stop the production of said signal whereby said switching means becomes non-conductive and said starting winding de-energized.

5. The combination according to claim 3 wherein said switching means is a semiconductor device.

6. In combination, an induction motor having a rotor and running and starting windings, a series conduit including solid state switching means and said starting winding connected in series relation, means for connecting said running winding and said series circuit to A.C. voltage supply means, said switching means being conductive an opposite half cycles of the supply voltage in response to the application of a signal thereto on opposite half cycles of the supply voltage, and control circuit means including circuit means coupled to said supply means and said starting winding for deriving a first potential proportional to the voltage of said supply means and a second potential which varies in accordance with the voltage induced in said starting winding due to rotation of said rotor, and means coupled to said switching means and responsive to said first and second potentials for supplying a signal to said switching means to effect conduction thereof and energization of said starting winding only when said induced voltage is below a predetermined value.

7. In combination, a single-phase induction motor having running and starting windings, a series circuit including solid state switching means and said starting winding connected in series circuit relation, means for connecting said running winding and said series circuit to alternating current voltage supply means, said switching means being conductive to allow current flow therethrough on opposite half cycles of the supply voltage in response to the application thereto of a signal on opposite half cycles of the supply voltage, and control means coupled to said switching means including a signal producing circuit responsive to the application of said supply voltage thereto for supplying signals to said switching means for effecting conduction of said switching means on opposite half cycles of the supply voltage to energize said starting winding for starting the motor, said signal producing circuit including means coupled to said starting winding and responsive to voltage induced in said starting winding for stopping the supply of said signals to said switching means when said induced voltage exceeds a predetermined value to effectively de-energize said starting winding.

8. In combination, an induction motor having running and starting windings, a first circuit including semiconductor switching means and said starting winding connected in series circuit relation, means for connecting said running winding and said first circuit to alternating current voltage supply means, said switching means being conductive to allow energizing current flow to said starting winding on each half cycle of the supply voltage in response to the application thereto of a signal on each half cycle of the supply voltage, and signal producing circuit means coupled to said switching means for supplying a signal thereto on each half cycle of the voltage of said supply means during the starting period of the motor, said signal producing circuit means including a time constant circuit including energy storage means coupled between said voltage supply means and said starting winding so that said storage means is charged in response to said supply voltage and the voltage induced in said starting winding, and means coupled across said energy storage means and connected in circuit with said switching means for discharging said storage means when the voltage on said storage means reaches a predetermined value to supply a signal to said switching means on each half cycle of supply voltage when said induced voltage is below a preselected value, said time constant circuit being responsive to said induced voltage when above said preselected value to prevent the voltage on storage means from reaching said predetermined value to cause said switching means to block energizing current flow to said starting winding.

9. In combination, an induction motor having a rotor and running and starting windings, a first circuit including voltage breakdown semiconductor switching means and said starting winding connected in series circuit relation, means for connecting said running winding and said first circuit to alternating current voltage supply means, said switching means having a predetermined voltage breakdown value greater than the peak value of the supply voltage and being conductive to allow current flow to said starting winding on each half cycle of the supply voltage in response to the application thereto of a signal on each half cycle of the supply voltage, and signal producing circuit means coupled to said switching means for supplying a signal thereto on each half cycle of the voltage of said supply means during the starting period of the motor, said signal producing circuit means comprising a time constant circuit including energy storage means coupled between said voltage supply means and said starting winding and charged in response to said supply voltage and the voltage induced in said starting winding due to rotation of said rotor, and circuit means coupled across said energy storage means including means for discharging said storage means when said storage means is charged to a predetermined voltage value, and means coupled to said switching means to supply a signal in response to the discharge of said storage means to said switching means to raise the voltage on said switching means to said breakdown voltage value on each half cycle of supply voltage when said induced voltage is below a preselected value, said time constant circuit being responsive to said induced voltage when above said preselected value to prevent the voltage on said storage means from reaching said predetermined value to thereby cause said switching means to be non-conductive and said starting winding effectively de-energized.

10. In combination, a single-phase induction motor having a rotor, and starting and running windings physically displaced, a first circuit including voltage breakdown symmetrical avalanche semiconductor switching means and said starting winding in series circuit relation, means for connecting said running winding and said first circuit to said voltage supply means, said switching means having a predetermined breakdown voltage value higher than the voltage supplied thereto by said supply means and exhibiting a high impedance to current flow therethrough when a voltage below the predetermined breakdown voltage value is applied thereto and when a voltage of the predetermined breakdown value is applied thereto said switching means is triggered to a low impedance state to allow current flow therethrough until the current flow reaches a predetermined low value, and a pulse forming circuit comprising a capacitor and a charging circuit for said capacitor connected between said supply means and said starting winding comprising impedance means for deriving a voltage phase displaced from the supply voltage and which increases in magnitude in response to an increase in the voltage induced in said starting winding due to an increase in the speed of rotation of said rotor, a transformer having a primary winding and a secondary winding, said secondary winding being coupled in said first circuit, and a capacitor discharge circuit connected across said capacitor including said primary winding and voltage breakdown semiconductor means connected in series relation, said semiconductor means being fired into conduction in response to a predetermined value of voltage on said capacitor to discharge said capacitor through said primary winding and induce a voltage pulse in said secondary winding to trigger said switching means to its low impedance state thereby allowing energizing current to flow to said starting winding on each half cycle of the supply voltage during the starting period of the motor, said phase displaced voltage reducing the voltage on said capacitor below said predetermined value when said induced voltage in said starting winding is above a preselected value to prevent the firing of said semiconductor means and maintain said switching means in its high impedance state thereby effecting de-energization of said starting winding.

11. In combination, a single-phase induction motor having a rotor and running and starting windings, a pair of input terminals for connection to an A.C. voltage supply source, a starting winding circuit connected between said input terminals and including signal responsive semiconductor switching means and said starting winding connected in series with each other, said switching means being conductive on each half cycle of the supply voltage in response to the application thereto of a signal on each half cycle of the supply voltage, a capacitor, a capacitor charging circuit including a first pair of impedances connected in series between a first pair of circuit terminals, one of said circuit terminals being connected to one of said input terminals and the other of said circuit terminals being connected to a first circuit point between said switching means and said starting winding, and a second pair of impedances connected in series between one of said first pair of circuit terminals and the other of said input terminals, said capacitor being connected between a second circuit point located between said first pair of impedances and a third circuit point located between said second pair of impedances whereby said capacitor is charged in response to the supply voltage and the voltage induced in said starting winding due to rotation of said rotor, a capacitor discharge circuit connected across said capacitor including switch means responsive to a predetermined voltage on said capacitor for discharging said capacitor, and means coupled to said starting winding circuit for supplying a signal to said switching means on opposite half cycles of the supply voltage in response to the discharge of said capacitor to effect conduction of said switching means on each half cycle of the supply voltage until said induced voltage reaches a preselected value, said capacitor charging circuit being responsive to said induced voltage when above said preselected value to prevent said capacitor from charging to said predetermined value whereby said switching means remains non-conductive and said starting winding de-energized when said induced voltage is above said preselected value.

12. The combination according to claim 11 wherein said switching means comprises a bilateral conducting, two-terminal voltage breakdown device having a voltage breakdown value higher than the voltage applied thereto by said supply means, and said other means includes a transformer having a primary winding coupled in circuit with switch means and a secondary winding coupled in said starting winding circuit whereby said signal raises the voltage on said switching means to said breakdown voltage value.

13. The combination according to claim 11 wherein a capacitor is connected in series with said starting winding to shift the phase of the starting winding current with respect to the running winding current during the starting period of the motor.

14. The combination according to claim 11 wherein said switch means is a voltage breakdown symmetrical semiconductor device having a breakdown voltage value corresponding to said predetermined charge on said capacitor.

15. In combination, a single-phase induction motor having a rotor, and running and starting windings physically displaced from each other, a pair of input terminals for connection to an A.C. voltage supply source, a starting winding circuit connected between said input terminals and including signal responsive semiconductor switching means and said starting winding connected in series with each other, said switching means being conductive on each half cycle of the supply voltage in response to the application thereto of a signal on each half cycle of the supply voltage, a first pair of impedances connected in series between a first pair of circuit terminals, one of said circuit terminals being connected to one of said input terminals and the other of said circuit terminals being connected to a first circuit point between said switching means and said starting winding, a second pair of impedances connected in series between one of said first pair of circuit terminals and the other of said input terminals, a capacitor connected between a second circuit point located between said first pair of impedances and a third circuit point located between said second pair of impedances whereby said capacitor is charged in response to the supply voltage and the voltage induced in said starting winding due to rotation of said rotor, one of said impedances of said second pair comprising reactance means so that the voltage across the same is shifted in phase with respect to the voltage across the other impedance of said second pair whereby the maximum voltage across said capacitor decreases in response to an increase in said induced voltage above a predetermined value, a capacitor discharge circuit connected across said capacitor including semiconductor switch means responsive to a predetermined charge on said capacitor for discharging said capacitor, and other means coupled to said starting winding circuit for supplying a signal to said switching means on opposite half cycles of the supply voltage in response to the discharge of said capacitor to effect conduction of said switching means on each half cycle of the supply voltage until said induced voltage reaches said predetermined value whereby said switching means remains non-conductive and said starting winding de-energized when said induced voltage is above said predetermined value.

16. The combination according to claim 15 including a starting capacitor connected in said first circuit in series with said starting winding to effect a phase difference between the currents in said running and starting windings during the starting period of the motor.

17. The combination according to claim 16 wherein impedance means are connected across said starting capacitor to provide a discharge path therefor.

18. In combination, a single-phase induction motor having a rotor, a stator, and starting and running windings physically displaced in said stator, a first circuit including voltage breakdown symmetrical avalanche semiconductor switching means and said starting winding in series circuit relation, means for connecting said running winding and said first circuit to said voltage supply means, said switching means having a predetermined breakdown voltage value higher than the voltage applied thereto by said supply means and exhibiting a high impedance to current flow therethrough when a voltage below the predetermined breakdown voltage value is applied thereto and when a voltage of the predetermined breakdown value is applied thereto said switching means is triggered to a low impedance state until the current flow therethrough reaches a predetermined low value, circuit means including first, second and third circuit terminals, first and second resistors connected in series between said first and second terminals, a third resistor and a reactance element connected in series between said second and third terminals, means for supplying alternating voltage from said supply means between one of said first and second terminals and said third terminal, means connecting at least a portion of said starting winding between said third terminal and the other of said first and second terminals, a capacitor connected between a first circuit point located between said first and second resistors and a second circuit point located between said third resistor and said reactance element whereby the voltage on said capacitor varies in accordance with the voltage between said first and second circuit points, a pulse transformer having a primary winding and a secondary winding, said secondary winding being connected in series with said switching means, and a capacitor discharge circuit connected between said first and second circuit points including a bilateral voltage breakdown semiconductor device and said primary winding connected in series, said semiconductor device being triggered to its conductive state in response to a predetermined voltage on said capacitor to discharge said capacitor through said primary winding to induce a voltage in said primary winding to trigger said switching means to its low impedance state, said induced voltage when above a preselected magnitude reducing the voltage between said first and second circuit points to a value below said predetermined voltage to maintain said semiconductor device non-conductive and said switching means in its high impedance state to effectively maintain said starting winding de-energized.

19. Control means for controlling the energization of a circuit connected to alternating current voltage supply means in response to a variable voltage comprising signal responsive semiconductor switching means connected in series relation in said circuit, said switching means being conductive on each half cycle of said supply voltage in response to the application of a signal thereto on each half cycle of the supply voltage, and signal producing circuit means for supplying a signal to said switching means to effect conduction thereof on each half cycle of the supply voltage when said variable voltage is below a predetermined magnitude to effect energization of said circuit and to maintain said switching means nonconductive and said circuit de-energized when said variable voltage is above said predetermined value, said signal producing circuit means including energy storage means, means for charging said storage means on each half cycle of said supply voltage in response to the voltage of said supply means and said variable voltage, and means coupled across said energy storage means including means connected in circuit with said switching means for discharging said storage means when the voltage thereon reaches a predetermined value to supply a signal to said switching means on each half cycle of the supply voltage, said charging means being responsive to said variable voltage when above said predetermined magnitude to reduce the voltage on said storage means to a value below said predetermined value to thereby prevent the discharge of said storage means and maintain said switching means non-conductive.

20. Control means for controlling the energization of a circuit connected to alternating voltage supply means in response to a variable voltage comprising signal responsive semiconductor switching means connected in series relation in said circuit, said switching means being conductive on each half cycle of said supply voltage only in response to the application of a signal thereto on each half cycle of the supply voltage, and control circuit means for supplying a signal to said switching means to effect conduction thereof on each half cycle of the supply voltage in response to a variable voltage when below a predetermined magnitude to effect energization of said circuit, and to maintain said switching means non-conductive and said circuit de-energized when said variable voltage is above said predetermined value, said control circuit means comprising first, second and third circuit terminals, a first pair of impedance elements connected in series between said first and second terminals, a second pair of impedance elements connected in series between one of said first and second terminals and said third terminal, one of said impedance elements of said second pair comprising reactance means, means for connecting one of said first and second terminals and said third terminal to said voltage supply means, means for applying said variable voltage between the other of said first and second terminals and said third terminal, a capacitor connected between a first circuit point located between said first pair of impedance elements and a second circuit point located between said second pair of impedance elements whereby the voltage on said capacitor is responsive to the voltage between said first and second circuit points, a capacitor discharge circuit connected between said first and second circuit points including voltage breakdown, bilateral conducting means responsive to a predetermined voltage on said capacitor for discharging said capacitor, and means coupled to said switching means and responsive to the discharge of said capacitor for supplying a signal to said switching means for effecting conduction thereof, said control circuit means being responsive to said variable voltage to reduce the voltage between said first and second circuit points to a value below said predetermined voltage when said variable voltage is above a preselected value to maintain said bilateral conducting means and said switching means non-conductive and said circuit de-energized.

21. In an electric motor having running and starting windings, and means for connecting said running winding to voltage supply means, the combination therewith comprising a control circuit adapted to be energized by said supply means including signal responsive switching means connected in series with said starting winding to effect energization thereof when conductive and prevent effective energization thereof when non-conductive, and signal producing circuit means including means for producing a first voltage proportional to the vector sum of the voltage of said supply means and the voltage induced in said starting winding, means for producing a second voltage phase displaced from said first voltage, and means coupled to said switching means and responsive to the vector sum of said first and second voltages to supply a signal to said switching means to effect conduction thereof for starting the motor and until said last named vector sum falls below a predetermined value.

22. The electric motor according to claim 21, wherein said second voltage is proportional to the voltage induced in said starting winding.

23. The electric motor according to claim 21, wherein said second voltage is substantially of constant value.

24. In combination, an induction motor having running and starting windings, a first circuit including switching means and said starting winding connected in series circuit relation, means for connecting said running winding and said first circuit to alternating current voltage supply means, said switching means being conductive to allow energizing current flow to said starting winding on each half cycle of the supply voltage in response to the application thereto of a signal on each half cycle of the supply voltage, and control circuit means including first means for producing a first voltage proportional to the vector sum of the supply voltage and the voltage induced in said starting winding, second means for producing a second voltage phase displaced from said first voltage, and signal producing means responsive to the vector sum of said first and second voltages to produce said signal on each half cycle of the supply voltage until said last named vector sum falls below a predetermined value.

25. The combination according to claim 24, wherein said first means includes a pair of impedances connected in series with said starting winding and in parallel with said switching means.

26. The combination according to claim 25, wherein said second voltage is proportional to the voltage induced in said starting winding.

27. The combination according to claim 25, wherein said second voltage is of substantially constant value.

28. The combination according to claim 24, wherein said first and second means are impedances conductively connected in circuit with said starting winding and said supply means.

29. The combination according to claim 24, wherein said switching means is a semiconductor device.

30. The combination according to claim 29, wherein said signal producing means includes a pulse forming circuit including a capacitor and semiconductor switching device connected to dischagre said capacitor when the voltage thereon reaches a predetermined value.

31. The combination according to claim 2, wherein said switching means are connected in series circuit relation with said starting winding, and said control means include impedance means conductively connected in parallel circuit relation with said starting winding.

32. The combination according to claim 31, wherein said switching means comprise semiconductor switching means.

33. The combination according to claim 4, wherein said signal producing circuit means include impedance means conductively connected across said starting winding.

References Cited

UNITED STATES PATENTS

| | | | |
|---|---|---|---|
| 3,071,717 | 1/1963 | Gordon | 318—221 |
| 3,116,445 | 12/1963 | Wright | 318—220 |
| 3,226,620 | 12/1965 | Elliot et al. | 318—221 XR |
| 3,307,093 | 2/1967 | Wright | 318—221 |

ORIS L. RADER, *Primary Examiner.*

G. Z. RUBINSON, *Assistant Examiner.*

U.S. Cl. X.R.

318—227